(12) United States Patent
Schaupensteiner

(10) Patent No.: US 7,686,334 B2
(45) Date of Patent: Mar. 30, 2010

(54) CONTROL PANEL CONFIGURATION FOR A MOTOR VEHICLE

(75) Inventor: Walter Schaupensteiner, Rutesheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/179,444

(22) Filed: Jul. 24, 2008

(65) Prior Publication Data

US 2009/0026747 A1    Jan. 29, 2009

(30) Foreign Application Priority Data

Jul. 28, 2007    (DE) .................. 10 2007 035 482

(51) Int. Cl.
  *B60R 21/045* (2006.01)
  *B62D 25/14* (2006.01)
(52) U.S. Cl. ................... 280/752; 180/90; 296/70; 296/187.05
(58) Field of Classification Search .............. 280/752, 280/751, 753; 180/90; 296/70, 187.03, 187.05
  See application file for complete search history.

(56) References Cited

U.S. PATENT DOCUMENTS

| | | | | |
|---|---|---|---|---|
| 2,552,668 | A * | 5/1951 | Dath ........................... | 267/201 |
| 6,176,544 | B1 * | 1/2001 | Seksaria et al. ........ | 296/203.02 |
| 6,293,587 | B1 * | 9/2001 | Lapic et al. ................. | 280/784 |
| 6,837,518 | B2 * | 1/2005 | Mullan ........................ | 280/752 |
| 2006/0290123 | A1 * | 12/2006 | Motozawa et al. .......... | 280/752 |

FOREIGN PATENT DOCUMENTS

| | | |
|---|---|---|
| DE | 101 46 495 B4 | 10/2005 |
| JP | 8324454 | 12/1996 |

* cited by examiner

*Primary Examiner*—Ruth Ilan
*Assistant Examiner*—Keith Frisby
(74) *Attorney, Agent, or Firm*—Gerald E. Hespos

(57) ABSTRACT

A control panel configuration for a motor vehicle has a cross member that extends transversely to the vehicle longitudinal direction and is retained on fixed lateral construction structures. A control panel provides coverage toward the vehicle interior, and a knee retainer has a section for fastening the knee retainer to the cross member. A force absorption section extends essentially in the direction of the knee of an occupant. To reduce an intrusion of the control panel bottom parts, the knee retainer can be a rod-shaped support element that is loaded essentially longitudinally to its axis.

10 Claims, 3 Drawing Sheets

CONTROL PANEL CONFIGURATION FOR A MOTOR VEHICLE

CROSS-REFERENCE TO RELATED APPLICATIONS

This application claims priority to German Patent Application No. 10 2007 035 482.9 filed Jul. 28, 2007, the disclosure of which is incorporated by reference herein.

BACKGROUND AND SUMMARY OF THE INVENTION

The invention relates to a control panel configuration for a motor vehicle having a cross member, which extends transversely to the vehicle longitudinal direction and is retained on fixed lateral construction structures, a control panel for coverage toward the vehicle interior and a knee retainer which has a fastening section, the knee retainer being fastened to the cross member, and which has a force adsorption section which extends essentially in the direction of the knee of a vehicle occupant.

Situating knee receivers behind the control panel, which are provided with deformation apparatus and are thus capable of energy absorption, is known from mass produced vehicles.

Thus, DE 101 46 495 B4 discloses a control panel configuration for a motor vehicle having a cross member and having four knee receivers that are fastened using a fastening section to the cross member and have an upstream deformation section. The deformation section is designed so as to be capable of targeted energy absorption together with a support wall whereby the knee of a vehicle occupant is extensively protected during a defined collision.

For other load cases, for example, upon incidence of an occupant not wearing a seatbelt, it is necessary that the control panel not yield too strongly to prevent misalignment of the knee airbag system.

An object of the invention, is therefore, to reduce in a control panel configuration for a motor vehicle an intrusion of the control panel for the load case of an occupant not wearing a seatbelt while maintaining the advantageous effect of the control panel.

This object has been achieved according to the invention by configuring a force absorption section of a knee retainer as a rod-shaped element that is loaded substantially longitudinally to its axis.

A control panel configuration according to the present invention includes a cross member, that extends transversely to the vehicle longitudinal direction and is retained on fixed, lateral construction structures. The control panel configuration is covered toward the vehicle interior with a control panel, one or more knee retainers being located behind the control panel. Each of the knee retainers is fastened using a fastening section to the cross member and has a force absorption section that extends essentially in the direction of the vehicle occupant's knee. According to the invention, as above noted, the knee retainer is a rod-shaped support element that is essentially only loaded longitudinally to its axis. Essentially thereby no transverse forces are transmitted by this simple component and a force absorption and/or relay occurs from the beginning. The rigid configuration of the knee retainer prevents control panel bottom parts from intruding through the knee of an occupant enough that the knee airbag system is misaligned.

For an initially soft behavior of the control panel configuration, the knee retainer may end at a distance to a support wall which is assigned to the control panel.

Easy mounting results if the fastening section of the knee retainer is configured as tubular, the internal contour of the fastening section being implemented corresponding to an attachment part of the cross member. It is also advantageous if the knee retainer is configured to be plugged on or not, depending on the equipment variant or vehicle market. Clipping or plugging the knee retainer onto the attachment part may be implemented easily using catch lugs that are provided on the fastening section and engage behind recesses provided for this purpose on the attachment part. To ensure during its mounting that the knee retainer assumes the correct position, guide grooves may be provided on the internal contour.

An especially rigid implementation of the knee retainer may preferably be achieved by a cross-section with a double T-profile.

In a currently preferred embodiment of the invention, the force absorption section terminates toward the support section with a circular front wall. The adjoining support section may be formed by intersecting ribs. An elastic support of the control panel may be achieved if a rubber element is put onto the support section, with this rubber element bridging the distance to the support wall.

Other objects, advantages and novel features of the present invention will become apparent from the following detailed description of the invention when considered in conjunction with the accompanying drawings.

DETAILED DESCRIPTION OF THE DRAWINGS

Figure 1:
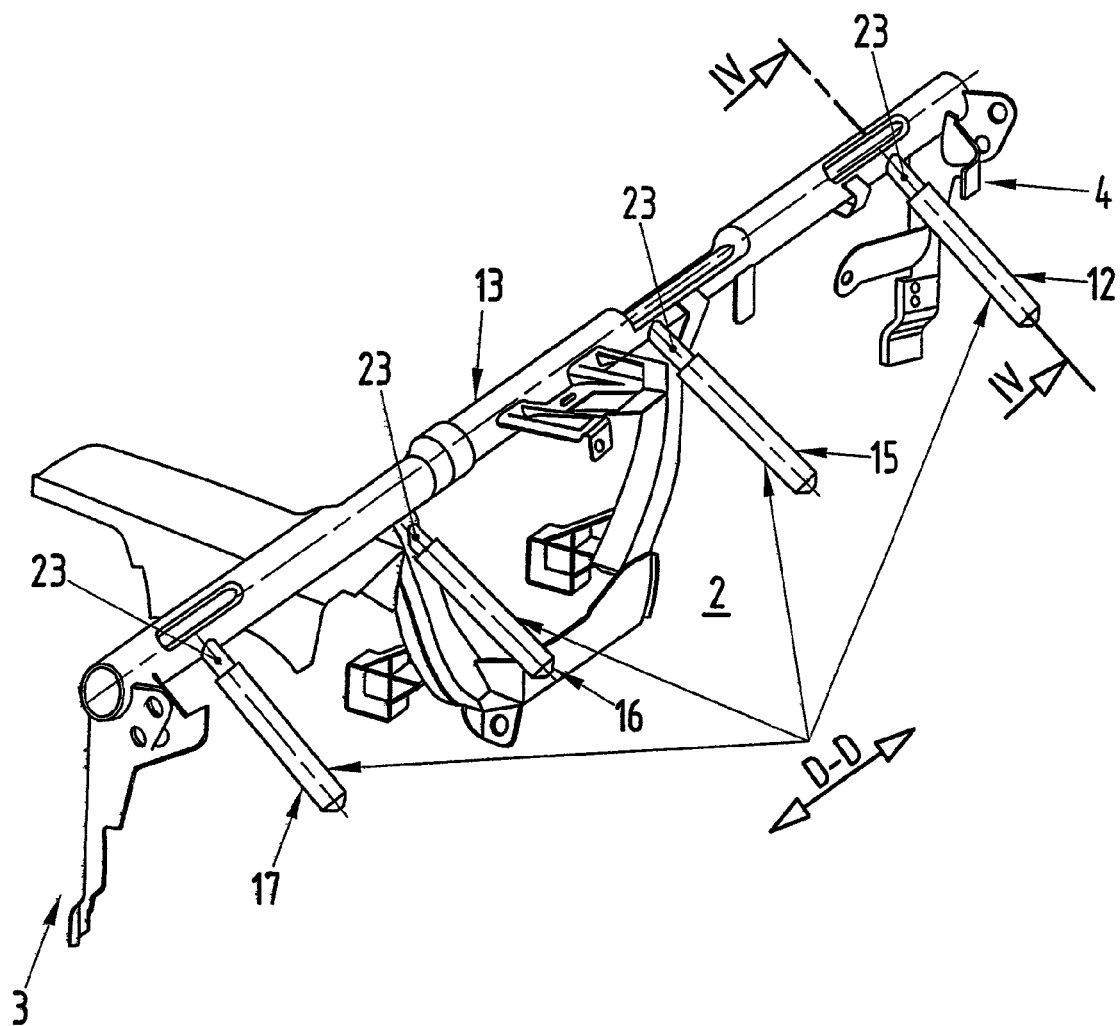
FIG. 1 is a perspective view of a control panel configuration but without the control panel being illustrated.
Figure 4:
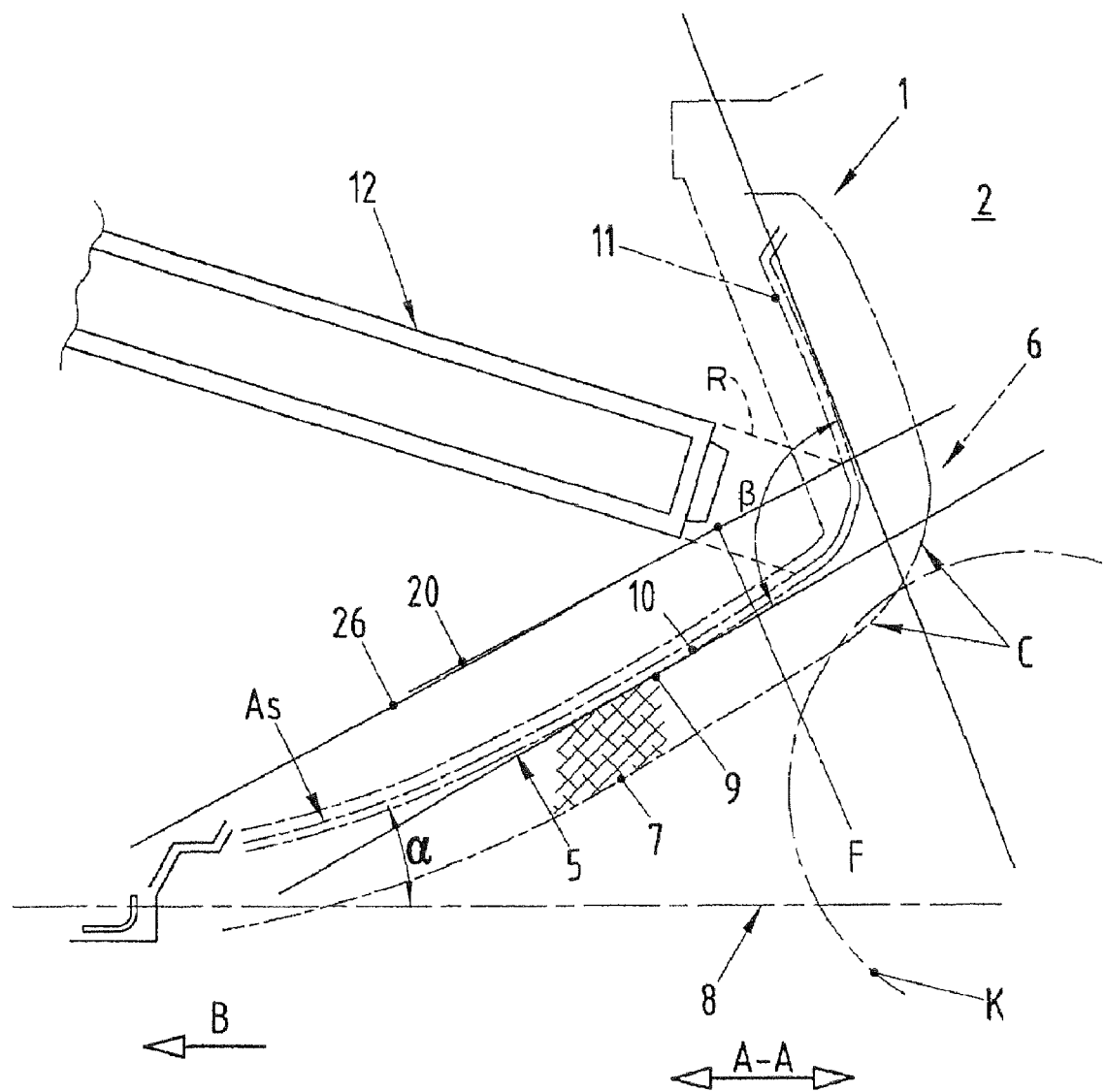
FIG. 4 is a cross-sectional view through a control panel configuration according to the present invention along line IV-IV in FIG. 1.

As seen in FIGS. 1 and 4, a motor vehicle control panel designated generally by numeral 1 extends transversely to a vehicle longitudinal direction A-A in a passenger compartment 2 between fixed lateral construction structures designated generally by numerals 3, 4 such as the A columns. The control panel 1 includes an angled frame 5 that is provided with a cushion 7 on the side 6 facing toward the passenger compartment 2. Viewed in cross-section as seen in FIG. 4, the angled frame 5 has a lower leg 10 running at an angle α to a the horizontal 8 and implemented rising opposite to the travel direction B as the support wall 9, and an upper leg 11 directed upward in the travel direction B. The legs 10 and 11 enclose an angle β. Approximately at the transition C between the leg 10 and the leg 11, the control panel 1 and/or its support wall 9 is oriented toward a schematically-shown knee K of an occupant who is seated on the motor vehicle's front seat.

Viewed in the travel direction B, a knee support 12 is situated in front of the control panel 1, whose location is only schematically illustrated in FIG. 4. The knee support 12 is fastened to a cross member 13 which is retained on the lateral construction structures 3, 4. The cross member 13 has still further knee retainers 15, 16, 17 in addition to the knee support 12 to support the occupant's knee in case of an accident. In the illustrated embodiment, two knee retainers 12, 15 and 16, 17 are situated in each case on the driver and passenger sides, each laterally outside a constructively defined location of the knee of the driver and a passenger-viewed in the vehicle transverse direction D-D. Other types of the positioning of the knee retainers are, however, also contemplated.

Figure 3:
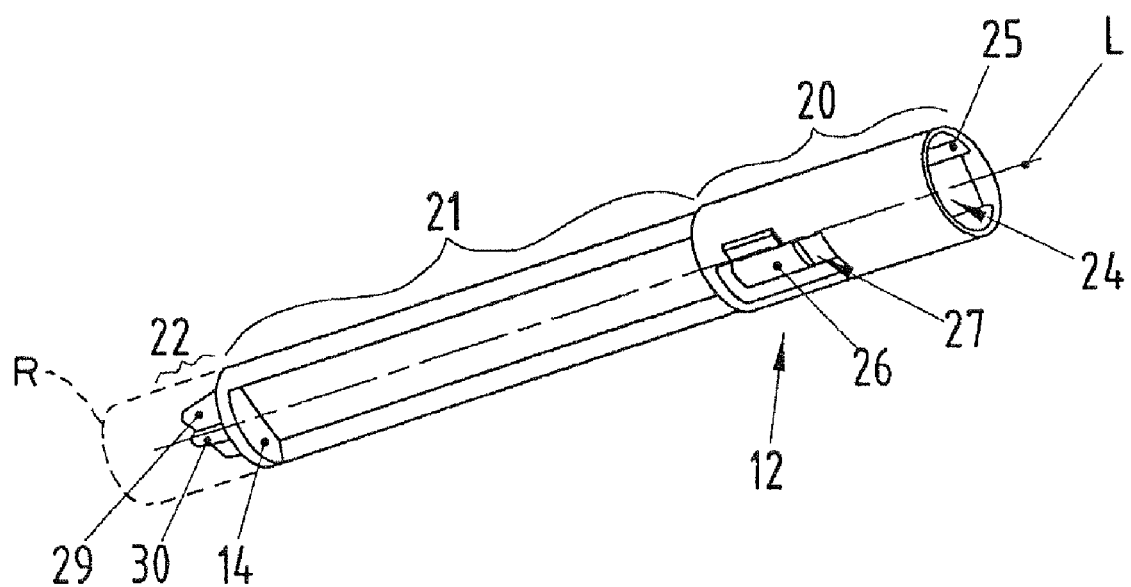
FIG. 3 is a view of an alternative embodiment of a knee retainer of FIG. 1.

One embodiment of the knee retainer 12 is shown in greater detail in FIG. 3. The knee retainer 12 there is a plastic part three-section composed of a fastening section 20, a force absorption section 21, and a support section 22. The fastening section 20 is tubular and is plugged onto an attachment part 23 (as seen in FIG. 1). To avoid incorrect mounting, a guide groove 25 is molded into the internal contour 24 so as to work together with a corresponding or mating counterpart on the attachment part 23. Catch lugs 26 are introduced in cutouts 27 on both sides on the fastening section 20, to engage the plastic knee retainer 12 on the attachment part 23 in its installed position.

The force absorption section 21 adjoining the fastening section 20 has a double T-profile cross-section and is thus only slightly deformable along its axis. The longitudinal axis of the fastening section 20 is identical to the longitudinal axis L of the force absorption section 21.

The support section 22 of the knee retainer 12 terminates it in the direction of the control panel 1. A circular front wall 14 is situated between the support section 22 and the force absorption section 21. The support section 22 comprises two ribs 29, 30 which mutually intersect and which are spaced from i.e. end at a distance in front of the control panel. A rubber element R optionally may be put onto this support section 22 as shown in FIGS. 3 and 4.

Figure 2:
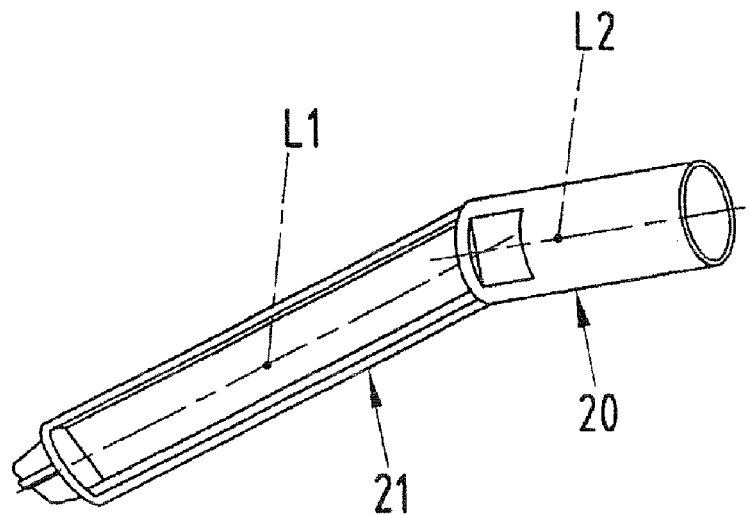
FIG. 2 is a detailed view of the knee retainer of FIG. 1.

The knee retainer 16 shown in FIG. 2 differs from the knee retainer 12 from FIG. 3 in that the longitudinal axis L1 of the force absorption section 21 is not identical to the longitudinal axis L2 of the tubular fastening section 20. This is because the knee retainer is to be targeted directly to the constructively defined location of the knee of the driver or passenger.

In the event of an impact of the vehicle, the occupant is displaced or forced forward, i.e., also the knee K, which first contacts the side 6 facing toward the passenger compartment 2, i.e., the cushion 7. The distance situated between the front terminus of the knee retainer 12, 15, 16, 17 and the support wall 9 allows yielding behavior of the control panel 1 in an early phase of the impact. The support function of the knee retainer 12, 15, 16, 17 first comes into play when it comes to rest between knee retainer 12, 15, 16, 17 and the control panel 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A control panel configuration for a motor vehicle having two fixed lateral construction structures and a passenger compartment disposed at least partly between the two fixed lateral construction structures, the control panel configuration comprising: a cross that extends transversely to the vehicle longitudinal direction and is retained on the fixed lateral construction structures, attachment parts projecting from the cross member toward the passenger compartment, a control panel extending transversely of the vehicle longitudinal direction between the two fixed lateral construction structures, the control panel having a cushion facing toward the passenger compartment and having a support wall on a side of the cushion facing toward the cross-member, knee retainers, each of which has a tubular fastening section plugged onto a corresponding one of the attachment parts so that the respective knee retainer is fastened to the cross member, each of the knee retainers having a force absorption section, which extends essentially in a direction of a knee of an occupant and to a position spaced from the support wall of the control panel, wherein the force absorption section of the knee retainer is configured as a rod-shaped support element that is loadable substantially longitudinally relative to its axis.

2. The control panel configuration according to claim 1, wherein the fastening section has a tubular configuration that has an internal contour that matches the corresponding attachment part of the cross member.

3. The control panel configuration according to claim 2, wherein the fastening section has recesses for positioning catch lugs.

4. The control panel configuration according to claim 2, wherein a guide groove is provided in the internal contour of the fastening section.

5. The control panel configuration according to claim 1, wherein a cross-section of the force absorption section has a configuration with a narrow section and wide flanges at opposite ends of the narrow section.

6. The control panel configuration according to claim 5, wherein the knee retainer further has a support section at an end of the force absorption section opposite the fastening section, the force absorption section terminates toward the support section at a circular front wall.

7. The control panel configuration according to claim 6, wherein the support section is formed by intersecting ribs.

8. The control panel configuration according to claim 7, wherein a rubber element is pluggable onto the support section and is configured to bridge a distance between the knee retainer and the support wall.

9. The control panel configuration according to claim 6, wherein a rubber element is pluggable onto the support section and is configured to bridge a distance between the knee retainer and the support wall.

10. The control panel configuration according to claim 1, further comprising a rubber element that is pluggable onto an end of the knee retainer opposite the cross member and is dimensioned to bridge a distance between the knee retainer and the support wall.

* * * * *